Patented Dec. 31, 1940

2,227,058

UNITED STATES PATENT OFFICE 2,227,058

TERPENE-CYANOACYL COMPOUND AND
METHOD OF PRODUCING SAME

Joseph N. Borglin, Wilmington, Del., assignor to Hercules Powder Company, Wilmington, Del., a corporation of Delaware No Drawing. Application December 27, 1939,
Serial No. 311,169

18 Claims. (Cl. 260—454)

This invention relates to a new series of terpene compounds and more particularly to a new series of terpene compounds having the type formula ROOCR'XCN in which R is the radical of an alcohol formed by condensing formaldehyde with an unsaturated terpene compound, in which R' is an aliphatic or aromatic radical, and in which X is sulfur, selenium, or tellurium. The invention also relates to a method for the production of these compounds.

By the method in accordance with this invention, I esterify an alcohol, formed by condensing formaldehyde with an unsaturated terpene compound, with a suitable halogen substituted acylating agent. I then react the esters so formed with a metal thiocyanate, a metal selenocyanate, or a metal tellurocyanate, which is reactive under the conditions employed.

The alcohols which I utilize are compounds formed by condensing formaldehyde with an unsaturated terpene compound. For example, the alcohol may be formed from an unsaturated monocyclic terpene hydrocarbon such as, for example, dipentene, terpinolene, terpinene, phellandrene, menthene, limonene, sylvestrene, or it may be formed from an unsaturated dicyclic terpene hydrocarbon such as, for example, pinene (either the alpha or the beta form), camphene, bornylene, sabinene, fenchene, etc. or from an acyclic unsaturated terpene hydrocarbon such as, for example, allo-ocimene. Or, for example, these alcohols may be formed from an unsaturated terpene alcohol such as alpha-terpineol, beta-terpineol, geraniol, linalool, etc. or from an unsaturated terpene ether such as terpinyl methyl ether, terpinyl ethyl ether, terpinyl butyl ether, diethylene glycol ether or pinene, ethylene glycol ether of pinene, glycerol ether of pinene, etc. Commercial terpene cuts such as wood or gum turpentine, pine oil, etc. may, of course, be utilized. The condensate formed will have one or more hydroxyl groups depending upon the number of double bonds of the terpene compounds reacted upon and also upon the number of hydroxyls present in the original terpene compound.

The formaldehyde condensation may be carried out using procedures well known for this reaction. For example, formaldehyde and an unsaturated terpene compound may be mixed in the proportion of about one mol of terpene, about two mols of formaldehyde, and about two mols of acetic acid are added. This mixture is held at a temperature of about 125° C. for about one to about eight hours, forming the acetate of the condensation product which is then saponified to yield the alcohol utilized in the method of this invention. The condensate may be saturated or unsaturated. If it is unsaturated, it may be made more saturated by hydrogenation if desired. In referring to "the product of the condensation of formaldehyde with an unsaturated terpene" herein and in the claims, the term will include hydrogenated condensates as well as unhydrogenated condensates.

Suitable halogen substituted acylating agents which I may utilize are the halogen substituted carboxylic acids such as, for examples, monochloroacetic acid, dichloroacetic acid, trichloroacetic acid, alpha-chloropropionic acid, beta-chloropropionic acid, dichloropropionic acid, alpha, beta, or gamma-chlorobutyric acid, dichlorobutyric acid, chlorobenzoic acid, chlorolauric acid, chloromyristic acid, chlorostearic acid, chloroleic acid, chlorobenzoic acid, chlororicinoleic acid, chloroerucic acid, chlorobehenic acid, chloromalonic acid, chlorophthalic acid, etc. or the corresponding bromine, iodine, and fluorine substituted acids. Mixtures may be utilized, if desired. I may also utilize the anhydrides of halogen substituted carboxylic acids such as those hereinbefore mentioned. I may also use the acyl halides of these halogen substituted carboxylic acids.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, calcium thiocyanate, etc. When it is desired to make a selenocyanoacylate, the metal selenocyanate I may use, may be, for example, sodium selenocyanate, potassium selenocyanate, lithium selenocyanate, calcium selenocyanate, ammonium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The alcohol formed by condensing the formaldehyde with an unsaturated terpene compound in the presence of an organic acid, followed by saponification may first be reacted with a halogen substituted acylating agent and the resulting halogen acid ester isolated from by-products of the reaction. Preferably, acidic material is removed. The second stage of the reaction is the treatment of this halogen substituted acid ester with the metal thiocyanate, selenocyanate, or tellurocyanate as the case may be, followed by recovery of the product. I may carry out each of these steps in the presence of a suitable inert solvent and, in fact, I prefer to use an inert solvent such as, for example, ethanol, methanol, isopropanol, butanol, isobutanol, acetone, ethyl acetate, etc. in the second stage. Each step may be carried out at any temperature within the range between about 0° C. and about 250° C., and preferably in the range between about 50° C. and about 180° C. One or more acyl groups will be introduced depending upon the number of hydroxyls originally present and upon the proportions of the reactants.

The halogen substituted acylates of the first stage reaction are light in color if the reaction is carried out in the absence of oxygen, for example, under a blanket of $CO_2$. Substantially water white esters may be obtained by vacuum distillation. The color of the thiocyanoacylate products follows the color of the first stage ester from which they are prepared. Where very light colored products are desired and where it is desired to insure products of no odor or minimum odor, the first stage reaction may be conducted, if desired, in a non-oxidizing atmosphere, or the first stage product may be vacuum distilled, or both these measures may be taken.

The method in accordance with this invention will be further illustrated by the examples which follow. All parts and percentages are by weight unless otherwise specified.

Example 1

In this example a monohydric alcohol formed by condensing formaldehyde with dipentene in the presence of acetic acid, followed by saponification to yield the alcohol, is used. This alcohol had a hydroxyl content of 9.5%, a specific gravity at 15.6/15.6° C. of 0.9621, a refractive index at 20° C. of 1.5007, a specific rotation of −11.9° and a thiocyanogen number of 215. 25 parts of this alcohol and 20 parts of alpha-chloropropionic acid were heated for about 9 hours at a temperature of 160–165° C. A stream of carbon dioxide was passed through the flask during this period. The reaction mixture was cooled and about 45 parts of petroleum ether added. The mixture was then washed with water until free of acid. The petroleum ether was evaporated under reduced pressure whereby a yield of 17 parts of product analyzing 4.3% of chlorine was obtained.

11.5 parts of this product were mixed with 1.5 parts of sodium thiocyanate and 20 parts of 95% ethyl alcohol and the mixture heated under reflux for about 6 hours. About 35 parts of petroleum ether were then added and the mixture washed several times to remove alcohol, salt, and unreacted sodium thiocyanate. Volatile solvents were then removed by evaporation under reduced pressure. This left 12 parts of oily product containing the thiocyanopropionate of the dipentene formaldehyde condensate. The product analyzed 2.3% sulfur.

Example 2

In this example a hydrogenated dihydric alcohol, formed by the condensation of formaldehyde and dipentene and hydrogenating the product, was used. This alcohol analyzed 12.3% hydroxyl and had a thiocyanogen number of 4.2. 25 parts of the alcohol and 50 parts of alpha-bromo-n-butyric acid were heated together for about 9 hours at a temperature of 160–165° C. blanketed by a stream of carbon dioxide passing through the flask containing them. The mixture was then cooled and about 32 parts of petroleum ether added. Following the procedure of Example 1, a yield of 36 parts of terpene product analyzing 25% bromine was recovered.

28.5 parts of this terpene product were added to 9.5 parts of sodium thiocyanate and 40 parts of 95% ethyl alcohol and the mixture was refluxed for about 6½ hours. The product was recovered in the manner of Example 1. A yield of 28 parts of product, analyzing 9.8% sulfur and 1.3% bromine, containing the alpha-thiocyano-n-butyrate esters of the hydrogenated condensate, was obtained.

Example 3

In this example a hydrogenated monohydric alcohol formed by condensing dipentene and formaldehyde and hydrogenating the product was used. The alcohol analyzed 7.9% hydroxyl and had a thiocyanogen number of 3.0. 100 parts of this alcohol were heated with 8.5 parts of monochloroacetic acid for 12 hours at 170–180° C. The water formed was allowed to distill off through an 18-inch Hempel column. The mixture was cooled and about 140 parts of ethyl ether were added. This mixture was then water washed. Upon evaporating off the ethyl under reduced pressure, a yield of 110 parts of product analyzing 11.4% chlorine and consisting essentially of the chloroacetate of the alcohol utilized was obtained.

103 parts of the first stage product were refluxed for 12 hours with 100 parts of potassium thiocyanate and 120 parts of 95% ethyl alcohol. About 140 parts of ethyl ether was then added and the mixture washed several times with water. Volatile solvents were then evaporated off under reduced pressure. A yield of 107 parts of oily material was obtained. The residue of the steam distillation was 94 parts of product analyzing 9.9% sulfur and consisting essentially of the thiocyanoacetate of the alcohol initially utilized.

Example 4

In this example 25 parts of a dihydric alcohol cut from the reaction product of pinene and formaldehyde was added to 25 parts of alpha-chloropropionic acid. This mixture was heated for about 7½ hours at 160–165° C. About 17 parts of petroleum ether were added to the resulting mixture and the reaction product was recovered in the manner of Example 1. A yield of terpene product analyzing 11.9% chlorine and consisting essentially of chloropropionates of the alcohols used was obtained.

22 parts of the first stage product were mixed with 7.5 parts of sodium thiocyanate and 20 parts of 95% ethyl alcohol and the mixture heated under reflux for about 8 hours. The product was recovered in the manner of Example 1 using about 17 parts of petroleum ether to aid in the recovery. A yield of 14 parts of material, analyzing 8.7% sulfur, consisting essentially of the alpha-thiocyanopropionate of the alcohol initially utilized, was obtained.

Example 5

In this example 10 parts of an alcohol prepared by condensing formaldehyde with allo-ocimene are heated under reflux for 11 hours at a bath temperature of 100–110° C. with 6 parts of chloroacetic acid. Approximately 10 parts of petroleum ether and 10 parts of ethyl ether were added to the reaction mixture. The resulting mixture was then washed with water until acid free. Volatile solvents were then removed by evaporation under reduced pressure. A yield of 10.5 parts of product analyzing 5.9% chlorine was recovered.

8.5 parts of this product were mixed with 1.5 parts of sodium thiocyanate and 20 parts of 95% ethyl alcohol and the mixture was heated under reflux for 6 hours at a bath temperature of 115–125° C. About 21 parts of the 1:1 mixture of petroleum and methyl ethers were added to the reaction mixture. The resulting mixture was then washed with water until free of sodium thiocyanate. Upon removal of volatile solvents by evaporation under reduced pressure, a yield of 8 parts of product analyzing 4.6% sulfur and containing the thiocyanoacetate of the allo-ocimene formaldehyde condensation product was obtained.

*Example 6*

In this example 12 parts of the alcohol used in Example 5 and 8.5 parts of alpha-chloropropionic acid were heated together under reflux for 9.5 hours at a bath temperature of 100–110° C. About 21 parts of petroleum ether were added and the resulting mixture washed with water until free of acid. Volatile solvent was removed by evaporation under reduced pressure leaving a yield of 16 parts of product analyzing 4.9% chlorine.

10.5 parts of the chloropropionate product of the first stage was then mixed with 1.5 parts of sodium thiocyanate and about 20 parts of 95% ethyl alcohol and the mixture was heated under reflux for 7 hours at a bath temperature of 105–115° C. About 17 parts of petroleum ether were then added and the resulting mixture washed with water until free of sodium thiocyanate. Volatile solvent was then removed by evaporation at reduced pressure leaving 8.5 parts of product analyzing 2.6% sulfur and containing the alpha-thiocyanoproprionate of the allo-ocimene formaldehyde condensate.

*Example 7*

In this example 7.5 parts of the alcohol used in Example 5 was heated with 7.8 parts of alpha-bromo-n-butyric acid under reflux for 11 hours at a bath temperature of 100–110° C. About 21 parts of 1:1 mixture of petroleum and ethyl ethers were then added and the resulting mixture was washed with water until free of acid. Upon removing volatile solvents by evaporation under reduced pressure, a yield of 9.5 parts of product consisting essentially of the alpha-bromo-n-butyrate of the alcohol utilized and analyzing 11.7% bromine were recovered.

4 parts of the first stage product were mixed with 1 part of sodium thiocyanate and 16 parts of 95% ethyl alcohol and heated under reflux for 6 hours at a bath temperature of 115–125° C. Upon recovery of the product in the manner of the previous examples, 2 parts of product analyzing 3.7% sulfur and containing the thiocyano-n-butyrate of the allo-ocimene-formaldehyde alcohol were obtained.

The method in accordance with this invention also includes within its scope the procedure of reacting the halogen substituted acylating agent with the terpene-formaldehyde condensate as the condensate is formed. This is done by condensing the unsaturated terpene compound with the formaldehyde in the presence of the acylating agent. The halogen substituted acyl ester formed is then reacted with the metal thiocyanate, selenocyanate, or tellurocyanate. Alternatively, the condensation of the formaldehyde and the terpene may take place in an acid such as acetic acid and the condensate ester converted to a halogenated acyl ester by ester exchange using a halogenated carboxylic acid.

The products of the preceding examples contain in varying proportion unesterified terpene compounds. A certain portion of the original reactants is usually not esterified and in addition, there is some conversion of esters to terpene hydrocarbons in the second stage. These unesterified terpene materials may be removed by vacuum distillation or vacuum steam distillation if desired. However, there is in most cases no advantage gained in removing these materials. For example, when the products of this invention are utilized in insecticides and in the flotation of minerals, they are most conveniently used in the diluted form. Similarly inert solvents such as petroleum ether, etc., will as a rule not be completely removed.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification.

The term "aromatic" as used herein includes any radical containing a benzene linkage in its structure.

This application is a continuation-in-part of my previous application, Serial No. 198,687, filed March 29, 1938, entitled "Terpene-cyanoacyl compounds and methods of producing same" now Patent No. 2,217,611.

It will be understood that the details and examples as hereinbefore set forth are illustrative only, and that the invention as broadly described and claimed is in no way limited thereby.

What I claim and desire to protect by Letters Patent is:

1. A terpene compound having the type formula ROOCR'XCN in which R is a radical of an alcohol which is the product of condensation of formaldehyde with an unsaturated terpene compound, in which R' is a radical selected from the group consisting of aliphatic and aromatic radicals, and in which X is a member of the group consisting of sulfur, selenium, and tellurium.

2. A terpene compound having the type formula ROOCR'XCN in which R is a radical of an alcohol which is the product of condensation of formaldehyde with an unsaturated terpene hydrocarbon, in which R' is a radical selected from the group consisting of aliphatic and aromatic radicals, and in which X is a member of the group consisting of sulfur, selenium, and tellurium.

3. A thiocyanoacylate of an alcohol which is the product of condensation of formaldehyde with dipentene in which the acyl group is derived from an aliphatic acid.

4. A thiocyanoacylate of an alcohol which is the product of condensation of formaldehyde with pinene in which the acyl group is derived from an aliphatic acid.

5. A thiocyanoacylate of an alcohol which is the product of condensation of formaldehyde with allo-ocimene in which the acyl group is derived from an aliphatic acid.

6. A thiocyanoacetate of an alcohol which is the product of condensation of formaldehyde with an unsaturated terpene compound.

7. A thiocyanopropionate of an alcohol which is the product of condensation of formaldehyde with an unsaturated terpene compound.

8. A thiocyanobutyrate of an alcohol which is the product of condensation of formaldehyde with an unsaturated terpene compound.

9. A thiocyanoacetate of an alcohol which is the product of condensation of formaldehyde with pinene.

10. A thiocyanoacetate of an alcohol which is the product of condensation of formaldehyde with dipentene.

11. A thiocyanoacetate of an alcohol which is the product of condensation of formaldehyde with allo-ocimene.

12. A method for the production of the terpene compound described in claim 1 which comprises reacting an alcohol produced by the condensation of formaldehyde with an unsaturated terpene compound with a suitable halogen substituted acylating agent and then with a compound selected from the group consisting of metal thiocyanates, metal selenocyanates, and metal tellurocyanates which is at least partially soluble in the reaction mixture.

13. A method for the production of the terpene compound described in claim 1 which comprises reacting an alcohol produced by the condensation of formaldehyde with an unsaturated terpene compound with a halogen substituted carboxylic acid and then with a compound selected from the group consisting of metal thiocyanates, metal selenocyanates, metal tellurocyanates which is at least partially soluble in the reaction mixture.

14. A method for the production of the terpene compound described in claim 1 which comprises reacting an alcohol produced by the condensation of formaldehyde with an unsaturated terpene compound with a halogen substituted carboxylic acid anhydride and then with a compound selected from the group consisting of metal thiocyanates, metal selenocyanates, metal tellurocyanates which is at least partially soluble in the reaction mixture.

15. A method for the production of the terpene compound described in claim 1 which comprises reacting an alcohol produced by the condensation of formaldehyde with an unsaturated terpene compound with a halogen substituted acyl halide and then with a compound selected from the group consisting of metal thiocyanates, metal selenocyanates, metal tellurocyanates which is at least partially soluble in the reaction mixture.

16. A method for the production of the terpene compound described in claim 1 which comprises reacting an alcohol produced by the condensation of formaldehyde with an unsaturated terpene hydrocarbon with a halogen substituted lower fatty acid and then with an alkali metal thiocyanate.

17. A method for the production of the terpene compound described in claim 1 which comprises reacting an alcohol produced by the condensation of formaldehyde with an unsaturated terpene hydrocarbon with a halogen substituted lower fatty acid anhydride and then with an alkali metal thiocyanate.

18. A method for the production of the terpene compound described in claim 1 which comprises reacting an alcohol produced by the condensation of formaldehyde with an unsaturated terpene hydrocarbon with a halogen substituted lower fatty acyl halide and then with an alkali metal thiocyanate.

JOSEPH N. BORGLIN.